(12) United States Patent
Jha et al.

(10) Patent No.: US 11,414,216 B2
(45) Date of Patent: Aug. 16, 2022

(54) MONITORING AIRCRAFT WINDSCREEN BLADE USAGE AND HEALTH

(71) Applicant: ROSEMOUNT AEROSPACE INC., Burnsville, MN (US)

(72) Inventors: Ashutosh Kumar Jha, Karnataka (IN); Mahesh Ainapure, Karnataka (IN); Praveen Valiyaparambil, Karnataka (IN); Cal Roeske, Eagan, MN (US); Rameshkumar Balasubramanian, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 224 days.

(21) Appl. No.: 16/788,391

(22) Filed: Feb. 12, 2020

(65) Prior Publication Data

US 2021/0179296 A1    Jun. 17, 2021

(30) Foreign Application Priority Data

Dec. 13, 2019    (IN) .............................. 201911051847

(51) Int. Cl.

| | |
|---|---|
| *B64F 5/60* | (2017.01) |
| *B64C 1/14* | (2006.01) |
| *G06K 19/077* | (2006.01) |
| *G07C 5/00* | (2006.01) |
| *G07C 5/08* | (2006.01) |
| *B60S 1/38* | (2006.01) |

(52) U.S. Cl.
CPC .................. *B64F 5/60* (2017.01); *B64C 1/14* (2013.01); *G06K 19/07705* (2013.01); *G07C 5/006* (2013.01); *G07C 5/008* (2013.01); *G07C 5/085* (2013.01)

(58) Field of Classification Search
USPC ........................................................ 701/31.4
See application file for complete search history.

(56) References Cited

U.S. PATENT DOCUMENTS

| | | | |
|---|---|---|---|
| 2015/0008258 A1 | 1/2015 | Ernst | |
| 2018/0341794 A1* | 11/2018 | Balasubramanian | ........................ G06K 7/0008 |
| 2021/0179296 A1* | 6/2021 | Jha | ........................... B64C 1/14 |

FOREIGN PATENT DOCUMENTS

| | | |
|---|---|---|
| DE | 102013010639 A1 | 1/2015 |
| DE | 102016100831 A1 | 7/2016 |
| DE | 102016220087 A1 | 4/2018 |
| EP | 2253520 A2 | 11/2010 |
| EP | 3357768 A1 | 8/2018 |
| EP | 2243671 B1 | 2/2019 |

OTHER PUBLICATIONS

Extended European Search Report dated Apr. 29, 2021 for Application No. 20213920.0.

* cited by examiner

*Primary Examiner* — Tyler D Paige
(74) *Attorney, Agent, or Firm* — Cantor Colburn LLP

(57) ABSTRACT

Provided are embodiments for a method for monitoring a wiper system, the method includes reading a radio frequency identification (RFID) tag embedded in a wiper blade using a reader, comparing the read RFID tag to stored wiper blade information, determining a blade usage ratio for the wiper blade based on determining whether the wiper blade has been replaced, and providing an indication of a status of the wiper blade based at least in part on the blade usage ratio. Also provided are embodiments for a system for monitoring the health of the wiper system.

18 Claims, 10 Drawing Sheets

MONITORING AIRCRAFT WINDSCREEN BLADE USAGE AND HEALTH

CROSS-REFERENCE TO RELATED APPLICATIONS

This application claims the benefit of Indian Application No. 201911051847 filed Dec. 13, 2019, which is incorporated herein by reference in its entirety.

BACKGROUND

The present invention relates to a wiper and wash system, and more specifically to the monitoring of aircraft windscreen wiper blade usage and health.

Windscreen wiper and wash systems are used to clean and remove the debris from the windscreen. These windscreen wiper and wash systems can be equipped on different types of vehicles including aircraft, automobiles, and marine vehicles. The size and operation of the windscreen wiper and wash systems can vary depending on its application, and the operation of the windscreen wiper and wash system can be controlled by an operator. For example, the speed of the wiper system and the number of wash cycles can be selected and controlled by the operator. These aircraft wipers are controlled by pilot/copilot controls for start, stop, and speed control based on external environmental conditions to which the screen of the aircraft is exposed.

BRIEF DESCRIPTION

According to an embodiment, a method for monitoring a wiper system, the method includes reading a radio frequency identification (RFID) tag embedded in a wiper blade using a reader; comparing the read RFID tag to stored wiper blade information; determining a blade usage ratio for the wiper blade based on determining whether the wiper blade has been replaced; and providing an indication of a status of the wiper blade based at least in part on the blade usage ratio.

In addition to one or more of the features described herein, or as an alternative, further embodiments include responsive to an unsuccessful reading of the RFID tag, providing a fault indication.

In addition to one or more of the features described herein, or as an alternative, further embodiments include responsive to determining the wiper blade has been replaced, resetting the blade usage, otherwise continuing to increment the blade usage for the wiper blade.

In addition to one or more of the features described herein, or as an alternative, further embodiments include a status that is determined by comparing the blade usage ratio to a blade usage ratio threshold.

In addition to one or more of the features described herein, or as an alternative, further embodiments include a blade usage ratio is determined from the following equation:

$$\text{Blade Usage Ratio } (BUR) = \frac{\text{Current Blade Usage}}{\text{Blade Replacement Interval}}$$

wherein the current blade usage is at least one of a duration of time the wiper blade is operated or a number of sweeps the wiper blade is operated, and wherein the blade replacement interval is a configurable interval based on an expected life of the wiper blade.

In addition to one or more of the features described herein, or as an alternative, further embodiments include illuminating a corresponding LED based on comparing the blade usage ratio to a blade usage ratio threshold.

In addition to one or more of the features described herein, or as an alternative, further embodiments include monitoring, by an electronic control unit, an operation of the wiper blade of the wiper system; calculating a total duty cycle for operating the wiper blade; comparing the total duty cycle to a duty cycle threshold; and providing an indication of a health status of the wiper blade based at least in part on the comparison of the total duty cycle to the duty cycle threshold.

In addition to one or more of the features described herein, or as an alternative, further embodiments include operating the wiper blade system in at least a low-speed mode, a medium-speed mode, and a high-speed mode.

In addition to one or more of the features described herein, or as an alternative, further embodiments include calculating a duty cycle corresponding to each mode of operation of the wiper system.

In addition to one or more of the features described herein, or as an alternative, further embodiments include summing a duration of time the wiper blade is operated in each mode.

In addition to one or more of the features described herein, or as an alternative, further embodiments include connecting the ECU to at least one of an LED indicator system or external device (PED) to display the health status of the wiper blade based on the total duty cycle.

In addition to one or more of the features described herein, or as an alternative, further embodiments include responsive to installing a new wiper blade, storing the RFID of the new wiper blade; and resetting the total duty cycle stored for new wiper blade.

According to an embodiment, a system comprising one or more wiper blades; an electronic control unit configured to monitor the one or more wiper blades and determine a health status of the one or more wiper blades; and a radio-frequency identification (RFID) tag embedded in the one or more wiper blades.

In addition to one or more of the features described herein, or as an alternative, further embodiments include a portable electronic device (PED) configured to communicate with the control unit.

In addition to one or more of the features described herein, or as an alternative, further embodiments include an ECU that is configured to calculate a blade usage ratio for the one or more wiper blades that is based at least on one of a duration of time the one or more wiper blades are operated or a number of sweeps the one or more wiper blades are operated.

In addition to one or more of the features described herein, or as an alternative, further embodiments include a motor control unit that is configured to drive the one or more wiper arms and is coupled to the ECU, wherein the ECU is configured to monitor a duty cycle for each mode of operation of the wiper system.

In addition to one or more of the features described herein, or as an alternative, further embodiments include an LED indicator system that is configured to provide an indication of the health status of the one or more wiper blades.

In addition to one or more of the features described herein, or as an alternative, further embodiments include an ECU that is configured to automatically detect a replaced wiper blade based on the RFID tag.

In addition to one or more of the features described herein, or as an alternative, further embodiments include an interface to communicate with a ground maintenance server or cockpit for preventive maintenance to indicate a health status of the one or more wiper blades.

In addition to one or more of the features described herein, or as an alternative, further embodiments include a scanner configured to read the embedded RFID tag.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Aircraft are equipped with wipers to perform cleaning of the windscreen surface through wiper blades to prevent the accumulation of rain, dust, snow, insects, etc. Faulty wipers can cause visibility problems and can cause delays of operation due to unscheduled maintenance.

Currently, there are no mechanisms available to track the duration of usage of the wiper blades and also the duration from the installation date leading to sudden failures. In addition, current wiper systems do not have any wiper blade health and usage monitoring systems for the pilot or maintenance crew which can provide information indicating worn-out blades and potential field failures that can hamper the windscreen visibility.

Inspections are performed manually by visually inspecting the wiper blades, and the wiper blades degrade over a period of time and become non-functional. The low-speed operation can provide longer life while high-speed operation and heavy usage of the wiper blades can reduce its life. Lack of automatic techniques to identify failures in the wiper system may cause the airlines to delay/cancel the flights due to the unscheduled maintenance. The techniques described herein provide for the life history of the wiper blade for easy maintenance and avoids the unnecessary replacement of wiper blades.

Figure 1:
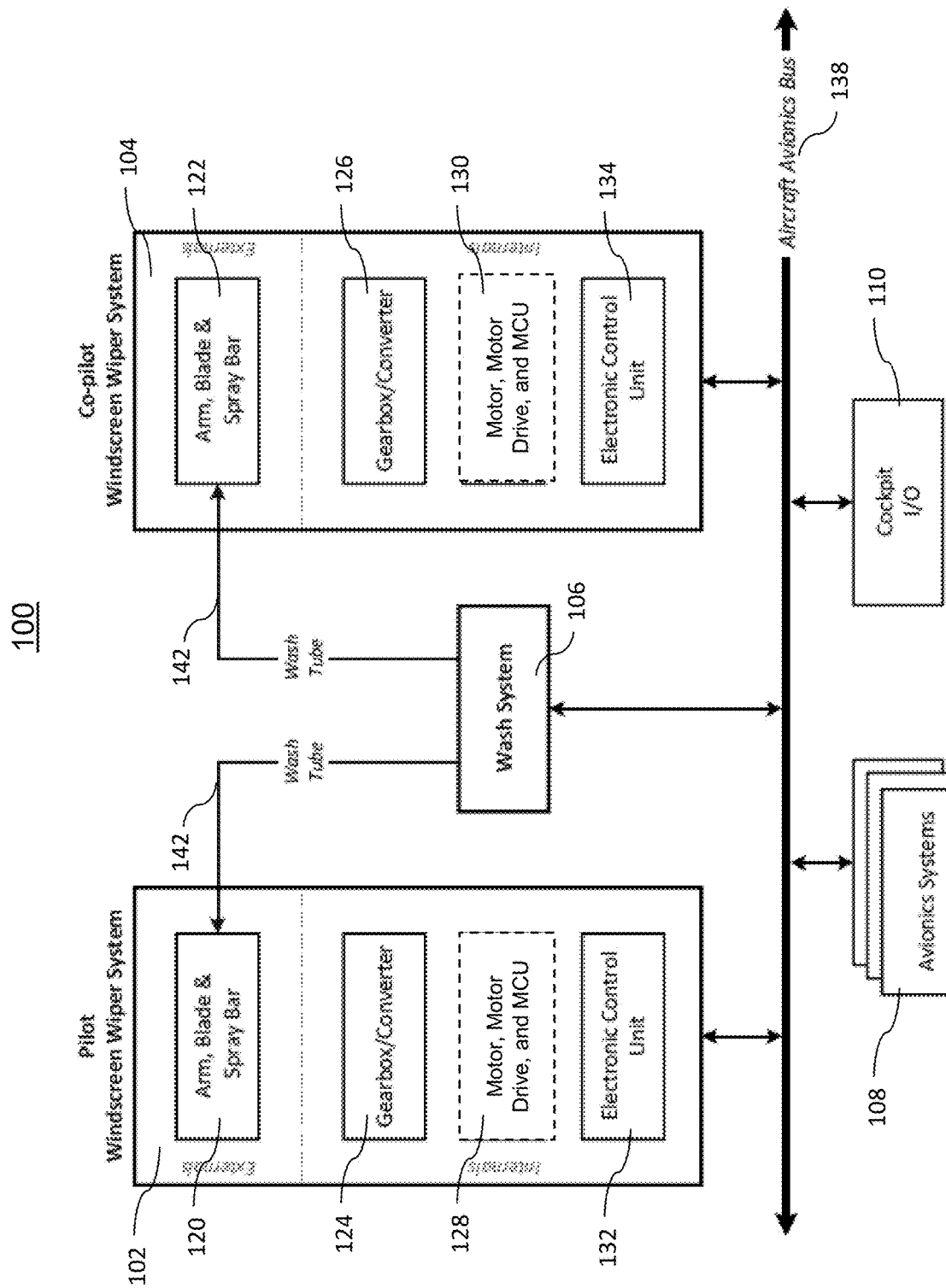
FIG. 1 depicts a wiper system in accordance with one or more embodiments.

FIG. 1 depicts a high-level architecture of the windscreen wiper and wash system 100. The system 100 includes a pilot wiper system 102 and a co-pilot wiper system 104. Each of the wiper systems 102 and 104 include an arm, blade and spray bar 120, 122; gearbox/converter 124, 126, brushless motor, motor drive, and motor control unit (MCU) 128, 130; and an electronic control unit 132, 134.

In addition, the system 100 also includes a wash system 106. The wash system 106 includes a wash tank and a wash fluid level sensor. The wash tank stores the wash fluid used when the wiper system is activated and is provided to the spray bar 120, 122 through the wash tubes 142. The level of the wash fluid in the wash tank is sensed using the fluid level sensor installed in the wash tank. In the event a low fluid level or below predefined threshold in the wash tank is detected, a fault can be reported to the wiper systems. The wiper system can further transmit the fault to the cockpit to alert the operators.

The system 100 includes avionics systems 108 and communicate with the pilot and co-pilot wiper systems via the aircraft avionics bus 138. The avionics systems 108 address both wiper systems independently using their assigned unique addresses. In addition, the avionics systems 108 implement logic to dynamically communicate and configure the wiper parameters (wiper speed, sweep angle, sweep area, wash control, wiper control, etc.). The avionics systems 108 are also configured to retrieve the maintenance fault logs from the fault log repository in the wiper system. The avionics system 108 can also monitor the wiper and wash systems status.

The system 100 also includes a cockpit I/O 110 which is configured to receive faults that may be encountered in the wiper system and the low-level wash fluid status. The cockpit I/O 110 also provides cockpit input to the wiper and wash systems such as setting the operational mode, wiping speed, washing operation, etc.

The aircraft avionics communication bus 138 can include wired communication interface such as ARINC 429, CAN, Ethernet, RS422/RS232, etc. or a wireless communication interface such as Bluetooth, Wi-Fi, wireless avionics intra-communication (WAIC), etc.

Figure 2:
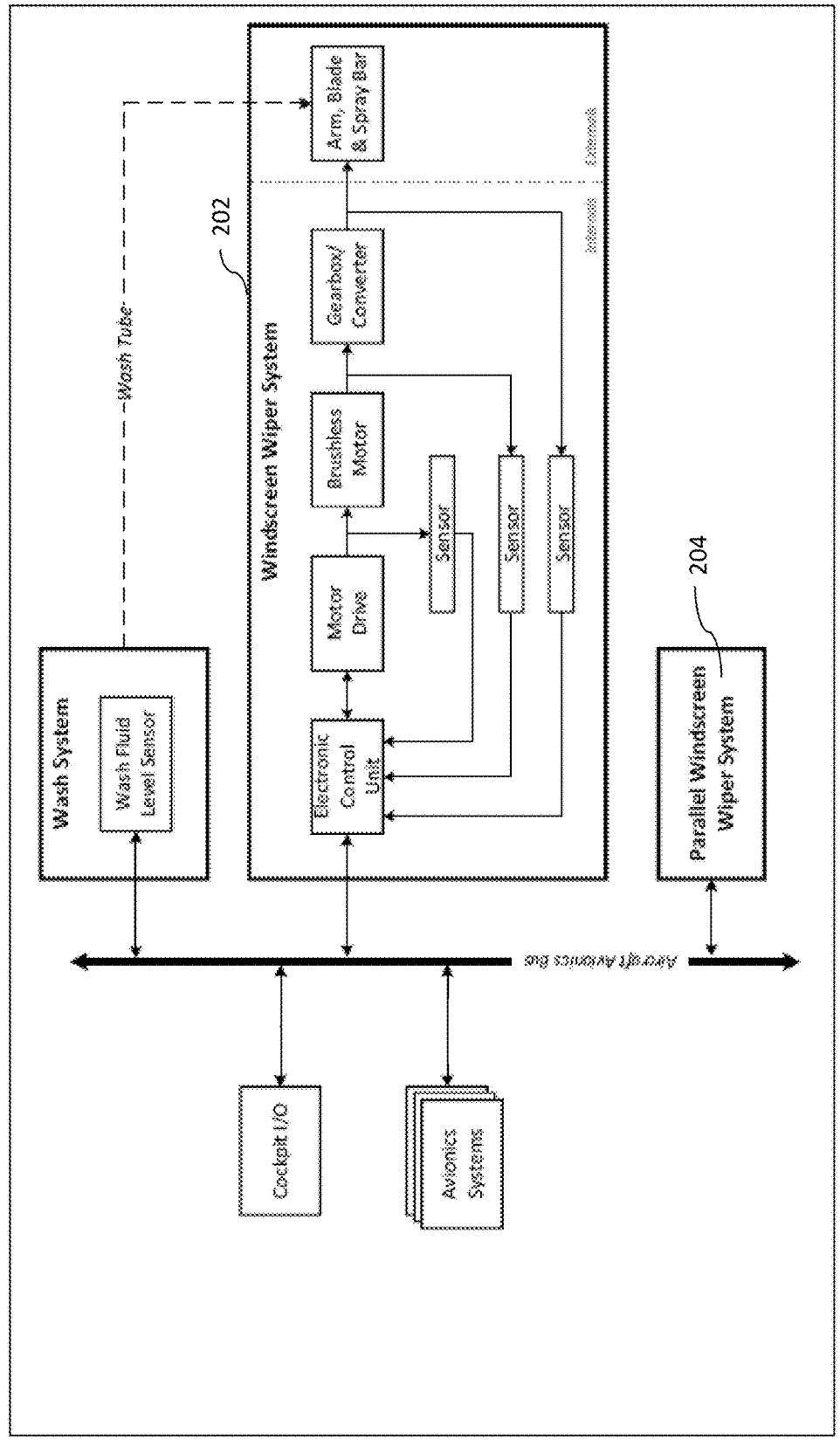
FIG. 2 depicts a different view of the wiper system shown in FIG. 1.

FIG. 2 depicts a detailed architecture of the wiper system and wash system in accordance with one or more embodiments. As shown, the wiper system 200 includes multiple components in addition to those described with respect to FIG. 1. The wiper systems 202, 204 include a plurality of sensors. For example, a first sensor is coupled to the output of the motor drive and the ECU, a second sensor is coupled to the output of the brushless motor and the ECU, and a third sensor is coupled to the output of the gearbox/converter and the ECU. It should be understood that additional sensors can be coupled to the ECU and other components of the wiper system to detect the proper operation of the wiper system. These sensors include current sensors, speed sensors, and position sensors.

Figure 3:
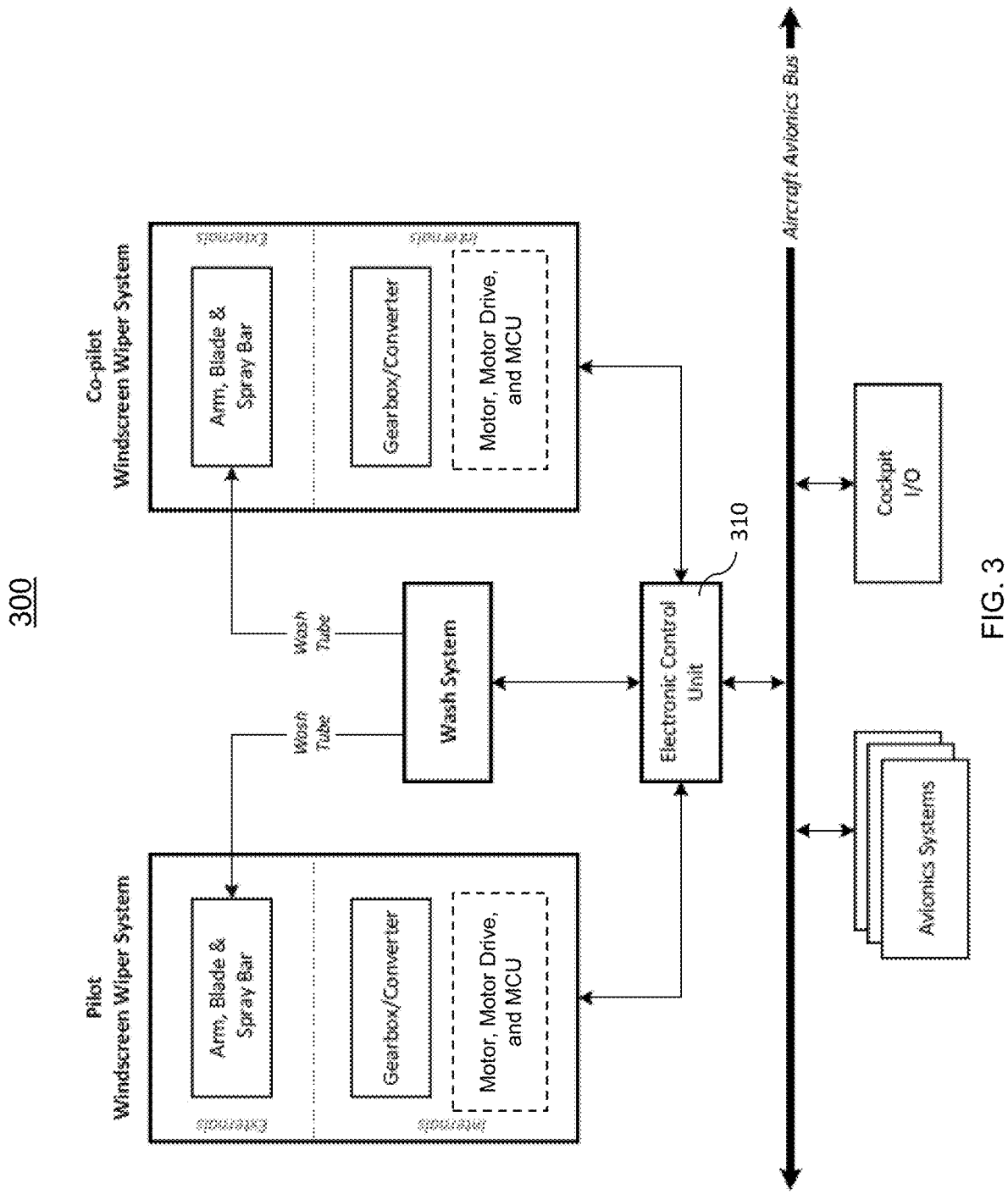
FIG. 3 depicts a wiper system having a common ECU in accordance with one or more embodiments.

FIG. 3 depicts a system architecture similar to that shown in FIG. 1 having a common ECU 310 in accordance with one or more embodiments. The pilot windscreen wiper system and the co-pilot windscreen wiper system can be configured with respective MCUs for controlling the wiper systems.

Figure 4:
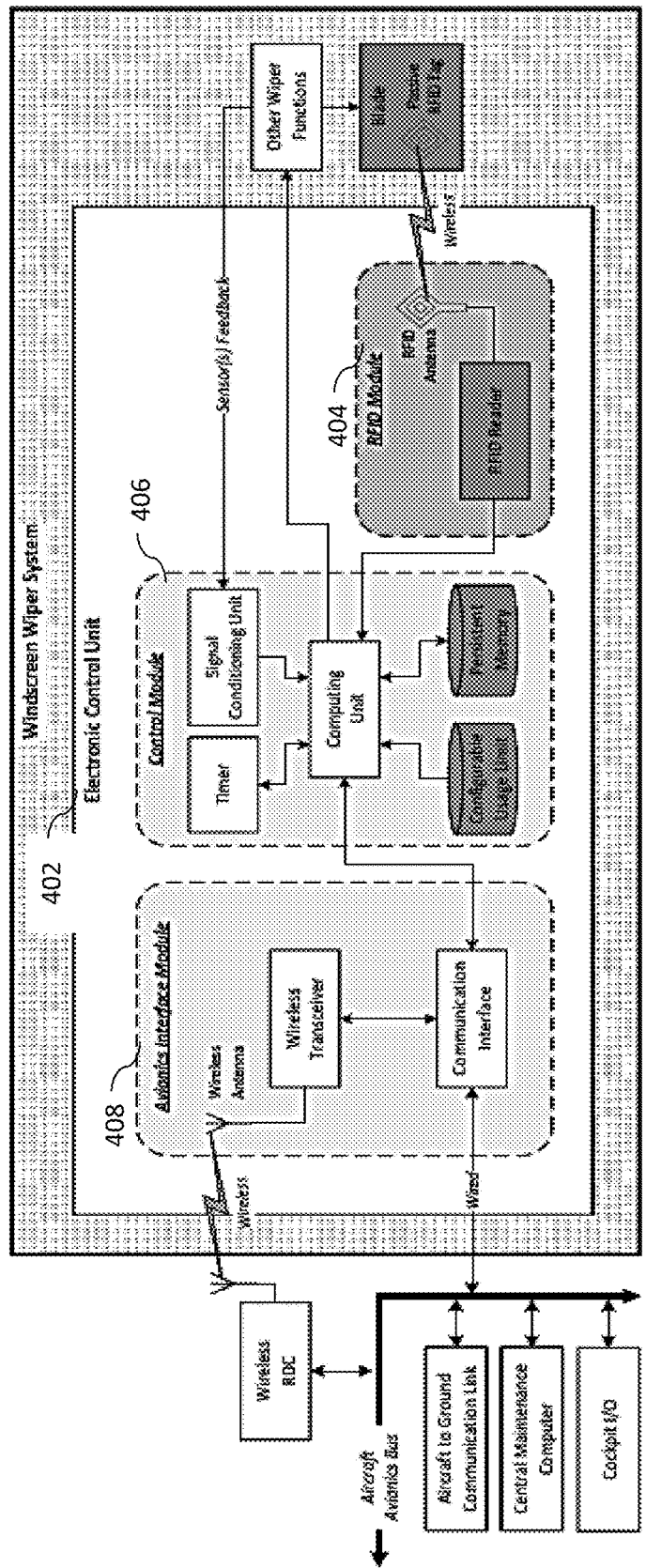
FIG. 4 depicts a windscreen wiper system including an RFID module and RFID tag in accordance with one or more embodiments.

FIG. 4 depicts a high-level architecture of the wiper system 400 for wiper blade monitoring in the windscreen wiper system. The ECU 402 is shown including an RFID module 404, Control Module 406, and Avionics Interface Module 408. The control module 406 of the ECU 402 includes a configurable usage limit and persistent memory. The blade replacement interval and blade retirement interval can be configured and stored in the persistent memory of the control module 406.

The computing unit of the ECU 402 is configured to determine whether the wiper blade has been replaced by comparing the currently read blade information associated with the RFID tag against the previously stored blade information from the persistent memory.

The computing unit interfaces with the avionics interface module 408 for reporting the current blade usage status to the cockpit and to a computing device such as but not limited to a ground maintenance computer or server, or other maintenance device such a laptop, PED, smart device, etc. for preventive maintenance.

The RFID module 404 of the ECU 402 includes an RFID reader that is configured to communicate with the RFID tag of the wiper blade. The RFID reader is configured to energize the passive RFID tags, responsively the RFID tag transmits a unique serial number to the RFID reader. The RFID antenna is used to communicate with the RFID tag of the wiper blade. The RFID reader obtains the blade information from the RFID tags such as the unique serial number that identifies the individual wiper blades.

In one or more embodiments, upon power-up or during initial built-in test (IBIT) process, the computing unit reads the blade information through the RFID reader and stores it in the persistent memory, and the computing unit compares the currently read blade information against the previously stored blade information from the persistent memory.

The Avionics Interface Module 408 also includes a communication interface that is configured to communicate over a wireless or wired communication channel. The communication interface is coupled to a wireless transceiver and wireless antenna to communicate over the wireless channel. The communication interface can be coupled to or directly connected to the wired connection such as the avionics bus.

The blade usage ratio (BUR) can be calculated according to the following Equation 1:

$$\text{Blade Usage Ratio } (BUR) = \frac{\text{Current Blade Usage}}{\text{Blade Replacement Interval}} \quad \text{(Eq. 1)}$$

where the current blade usage is based on a duration of operation of the wiper blades or a number/count of sweeps during operation of the wiper blades, and the replacement interval can be configured for a particular type, model, or material used for the blade.

The blade usage status can be determined as follows:

$$\text{Blade Usage Status} = \begin{cases} \text{Normal, } 0 \leq BUR < \text{Threshold1} \\ \text{Warning, Threshold1} \leq BUR < \text{Threshold2} \\ \text{Error Continue, Threshold2} < BUR < \text{Threshold3} \\ \text{Error Stop, Threshold3} < BUR \end{cases}$$

The ECU continuously monitors the wiper blade usage and determines the blade usage status. If the calculated BUR is less than a first threshold1, the wiper blades are healthy and the normal indicator is annunciated. If the BUR is between a first threshold1 and a second threshold2 a warning indicator is annunciated. If the BUR is between a second threshold2 and a third threshold3 an error continue alert is annunciated. In this error state operation of the wiper system is allowed to continue. If the BUR exceeds the third threshold3, and error stop alert is annunciated. In this error state, further operation is not recommended and the wiper system should be stopped to replace the wiper blades.

It should be understood that the thresholds can be configured based on different levels of alarms and types of wipers. The thresholds can be stored in the memory and used by the ECU to compare the current status of the wiper blades to the thresholds to determine the corresponding status indicator.

In one or more embodiments, the rubber wear out in the blade that can occur during use causes cuts in the tracks in the passive RFID tag. The computing unit identifies the installation of incompatible blades and/or blade rubber wear out in the wiper system by monitoring the unresponsiveness of the passive RFID tag embedded in the wiper blade.

Figure 5:
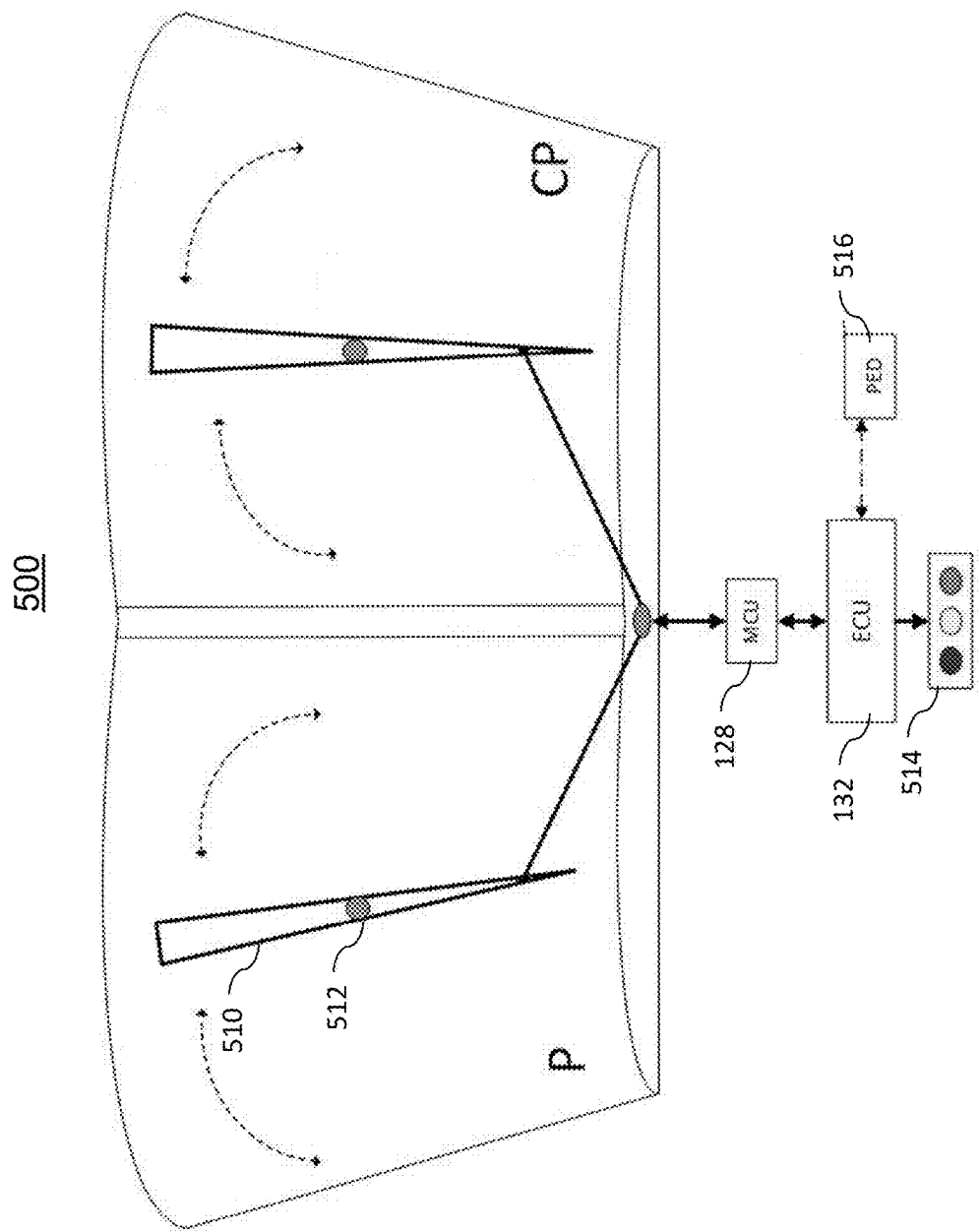
FIG. 5 depicts a windscreen wiper system coupled to a portable electronic device (PED) in accordance with one or more embodiments.

FIG. 5 depicts another diagram of a system 500 used for monitoring the health of the wiper blades system. As shown, the ECU 132 is coupled to the MCU 128 which controls the operation of the wipers 510, an LED indicators 514 configured to provide a health status of the wiper blades, and a PED 516 configured to communicate with the ECU 132. The data collected from the ECU 132 can be provided to and displayed on the PED for maintenance personnel.

The PED can be configured to communicate with the ECU over the communication interface or the wireless transceiver shown in FIG. 4. The PED can be connected to the ECU using a wired/wireless connection to download the wiper blade health and usage data. In addition, the PED can also receive the generated replacement indicators and reports. The PED provides an interface to alert the maintenance/crew of the detailed health status and replacement advisory of the wiper blade.

As shown, the RFID tags 512 are embedded in the wiper blades 510 that are attached to the wiper arms on the pilot side and the co-pilot side of the windscreen.

The indication system 514 having LED indicators can include a number of light indicators that can be activated by signals from the ECU. This can indicate the current health of the wipers based on the usage history of the wiper system based on the total duty cycle and motor commands processed during operation.

It should be understood that the ECU 132 can be configured with additional modules to run in a maintenance mode and perform the computation for the wiper blade usage. In one or more embodiments, in the event, the RFID reader or scanner is unavailable the wiper information (installation date and time, wiper blade identification, etc.) can be manually entered into the system.

Figure 6:
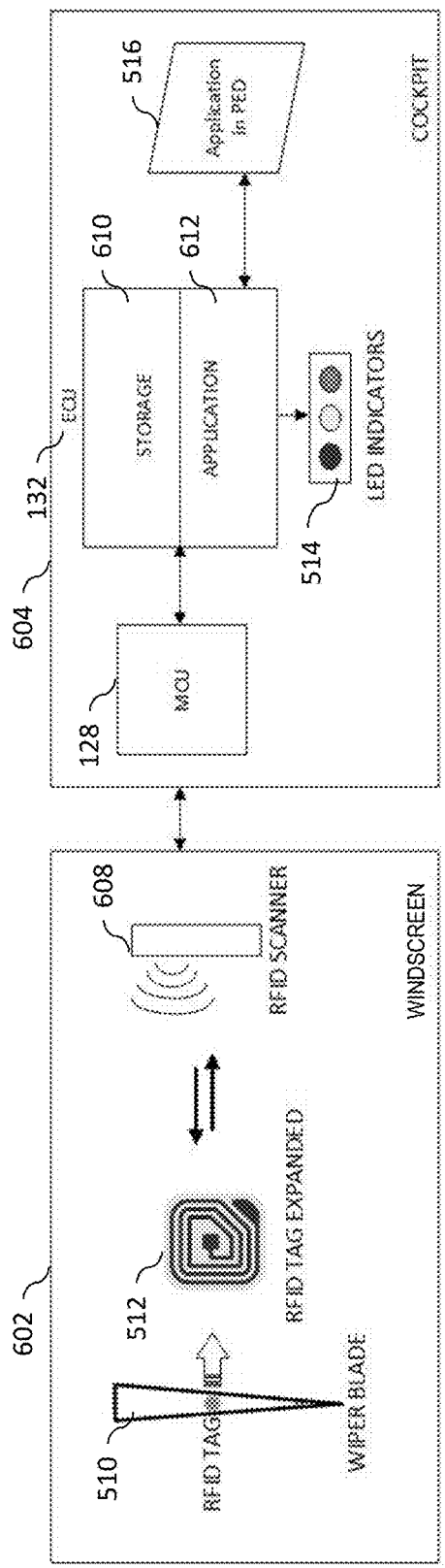
FIG. 6 depicts a different view of the architecture of FIG. 5 in accordance with one or more embodiments.

FIG. 6 depicts another view of the system of FIG. 5 used for health monitoring of the wiper blades system in accordance with one or more embodiments. FIG. 6 depicts the windscreen portion 602 and the cockpit portion 604 of the system. The windscreen portion 602 includes an RFID tag 512 that is embedded in the wiper blade 510 and is configured to communicate with an RFID scanner 608. The RFID tag 512 contains the wiper blade installation date and time stored. In one or more embodiments, an RFID scanner device is used to collect the data from the RFID tag 512.

The cockpit portion includes the ECU 132, the MCU 128, the LED indicators 514, and the PED 516. The ECU 132 is configured to continuously monitor the information and usage history of the blades and stored the information in the storage section 610 of the ECU 132. The application section 612 of the ECU 132 analyzes the data stored and applies arithmetic computations defined in the algorithms to compute the wiper blade usage. The total duty cycle remaining can be calculated as follows according to Equation 2:

$$\text{Total duty cycles remaining (TDc)} = \text{Estimated duty cycle (EDc)} - (f(t1) + f(t2) + f(t3))) \quad \text{(Eq. 2)}$$

where t is the function of the amount of time spent in a particular mode of operation. The estimated duty cycle is based on the life of the wiper blade.

The ECU 132 calculates the total duty cycle remaining and various indicators can be provided upon reaching configurable thresholds and/or levels. For example, the red LED can be illuminated when the wiper blade usage has reached the maximum limit. When the total duty cycle is half the life of the wiper blades a yellow LED can be illuminated and a green LED can be illuminated until the half age is reached. The ECU 132 can generate reports and logs for the processed data to indicate the health of the wiper blades.

It should be understood that any number and color of indicators can be used to provide various status levels. In addition, various alarms, alerts, feedback, etc. can also be coupled with the indicators to provide the status levels.

Figure 7:
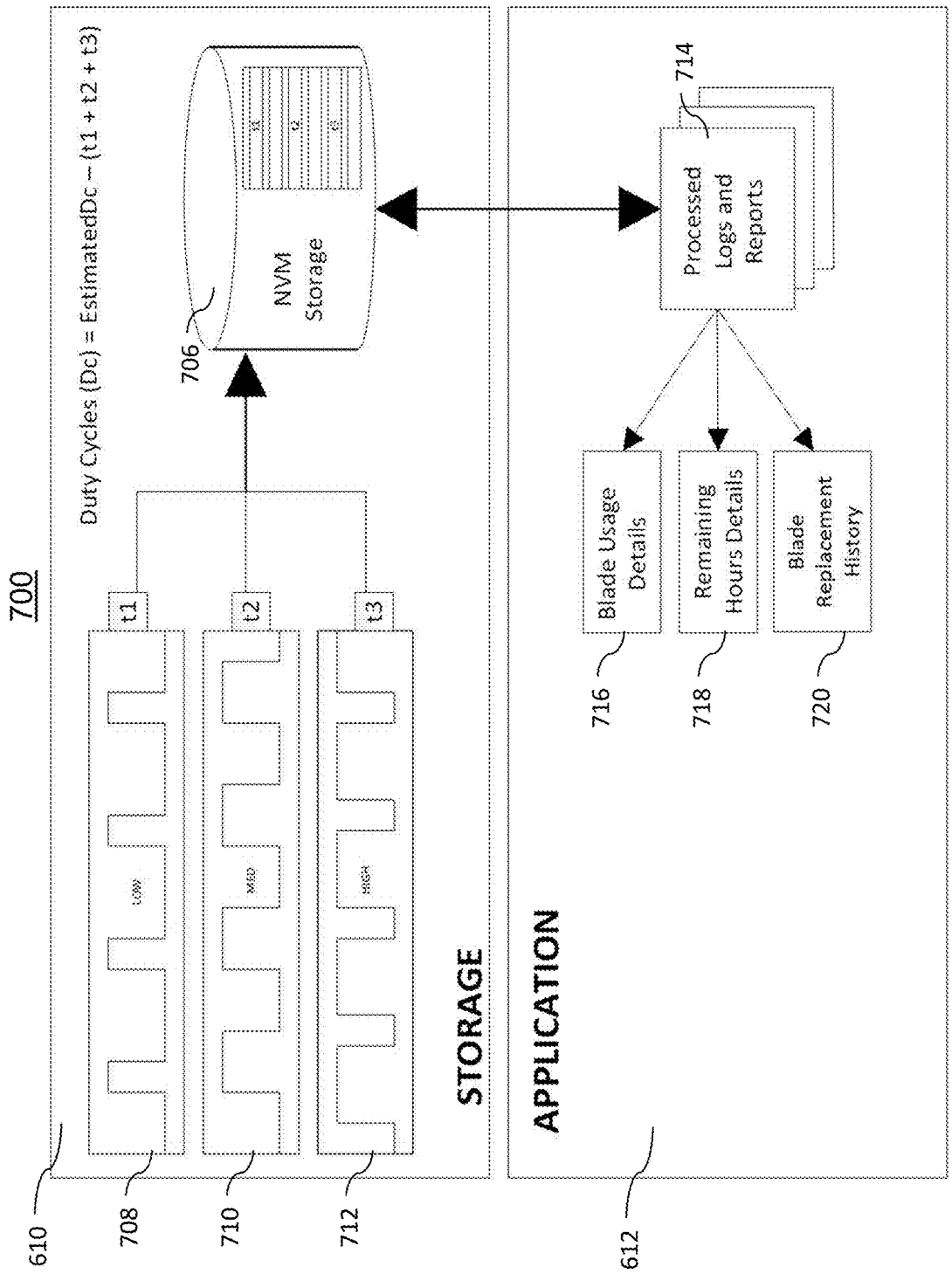
FIG. 7 depicts the storage section and application section of the ECU in accordance with one or more embodiments.

FIG. 7 depicts an illustration of the storage section 610 and the application section 612 of the ECU 132 in accordance with one or more embodiments. The storage section 610 of the ECU 132 stores the data in the storage 706. In one or more embodiments, the storage 706 can include a non-volatile memory (NVM). The storage 706 is configured to store the duration of time or a number of sweeps in which the wiper blades are operated in the various modes. For example, duration t1 is recorded in the storage 706 when operating the wiper system in the low-speed mode, duration t2 and t3 are recorded when operating in the medium-speed mode and high-speed mode, respectively. As shown, when operating in the low-speed mode the duty cycle for operating the windscreen wipers is lower than that of the medium-speed and high-speed modes.

The application section 612 processes the logs and generates various reports such as the blade usage details 716, remaining hours details 718, blade replacement history 720. It should be understood the application section 704 of the ECU can be configured to processing additional data and/or generate additional reports and is not limited by that provided in FIG. 7.

Figure 8:
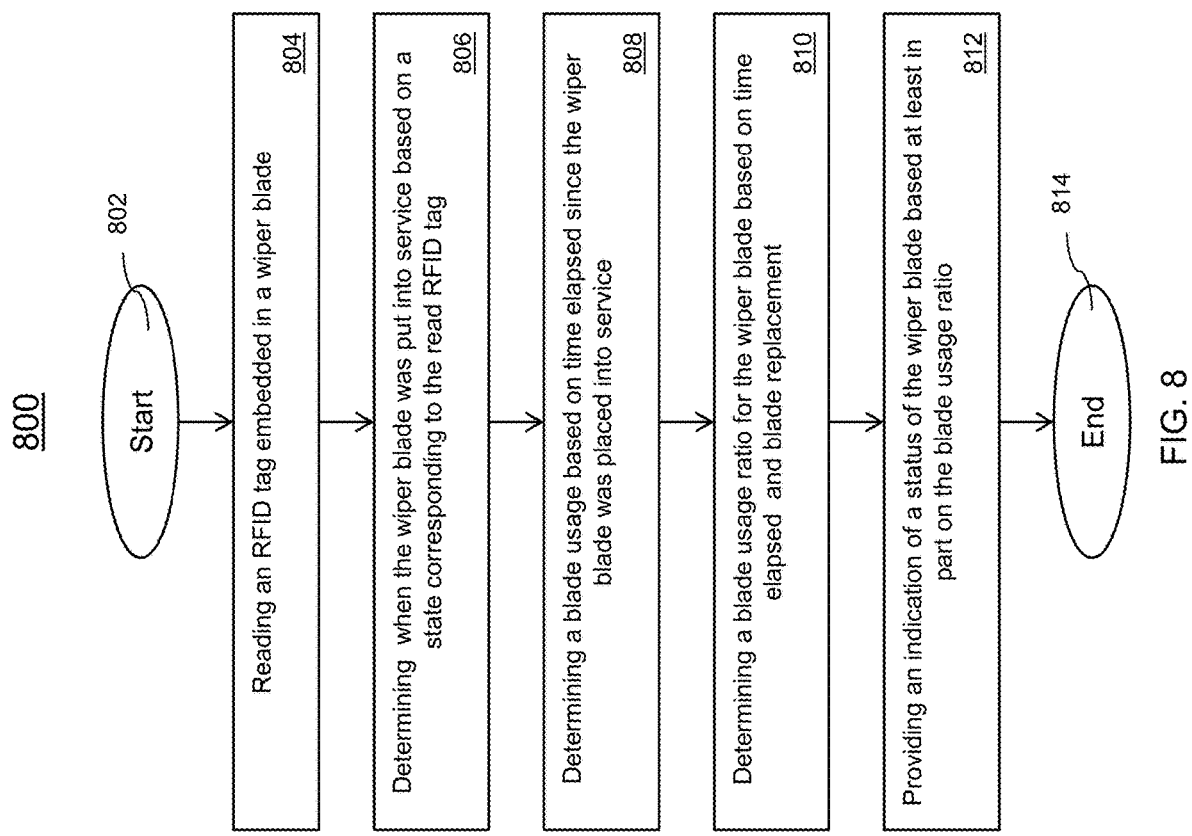
FIG. 8 depicts a method in accordance with one or more embodiments.

FIG. 8 depicts a method 800 for providing monitoring of the wiper system in accordance with one or more embodiments. The method 800 begins at block 802 and proceeds to block 804 which provides for reading an RFID tag embedded in a wiper blade using a reader. The reader energizes the RFID tag and obtains the blade information transmitted from the RFID tag. The read blade information can be stored in the memory of the ECU.

Block 806 determines when the wiper blade was put into service based on a state corresponding to the read RFID tag. In one or more embodiments, an ECU compares the read RFID tag to the stored wiper blade information. If the blade information does not result in a match, it is determined that the blade has been replaced and the usage count/blade usage ratio for the blade is reset. If there is a match, it is determined that the blades have not been replaced and the usage count/blade usage ratio continues to be added to the current count. In addition, in the event the reader is unable to obtain a successful read from the RFID tag, it can be determined that the RFID tag is damaged due to overuse or some other fault that requires further inspection exists.

Block 808 determines a blade usage based on time elapsed since the wiper blade was placed into service. Block 810 determines a blade usage ration for the wiper blade based on time elapsed and the blade replacement, and block 812 provides an indication of a status of the wiper blade based at least in part on the blade usage ratio.

Figure 9:
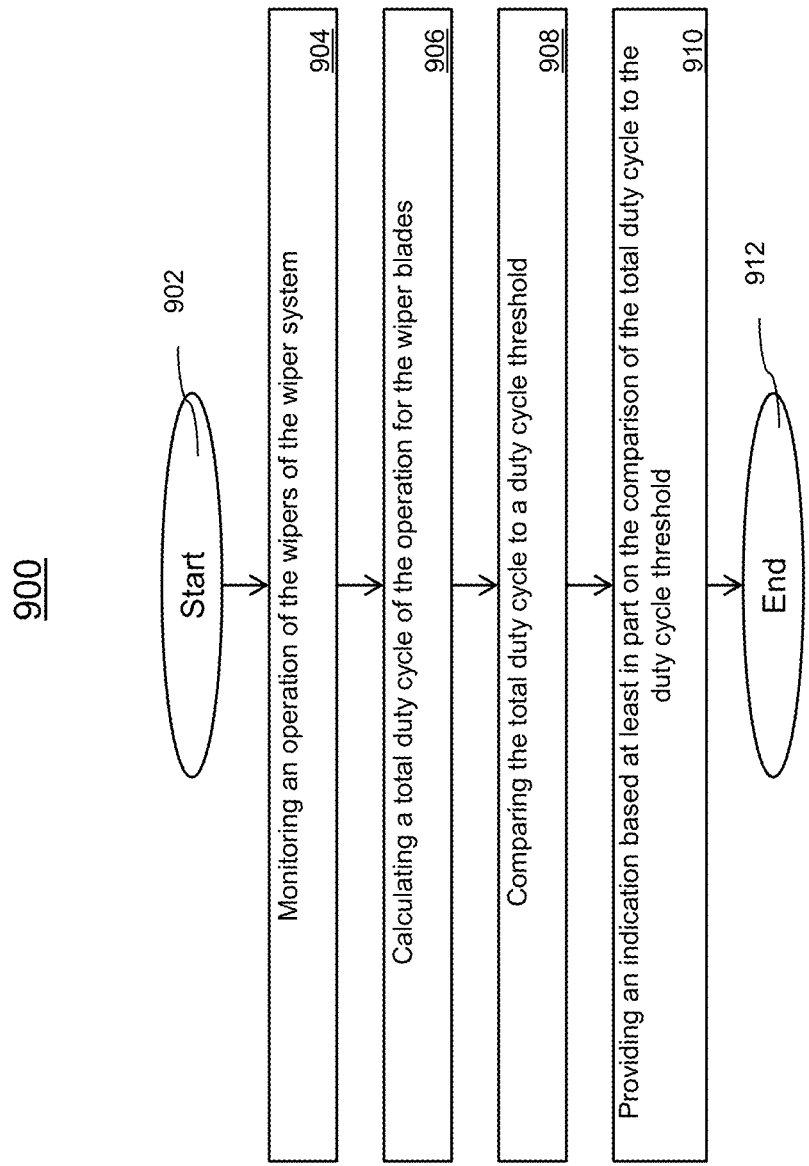
FIG. 9 depicts another method in accordance with one or more embodiments.

In one or more embodiments, the blade replacement interval and blade retirement interval can be stored in the persistent memory. The replacement interval and blade retirement interval are configurable parameter and can be based on the specific windscreen wiper that is being used. The method 800 can end at block 814. In other embodiments, the method 800 can continue to monitor the wiper blade as provided with reference to the method 900 of FIG. 9.

The method 900 for monitoring the health of a windscreen wiper system in accordance with one or more embodiments. The method 900 begins at block 902 and proceeds to block 904 which monitors, via an ECU, an operation of the wipers of the wiper system. The ECU is configured to monitor the duty cycle and motor commands from the MCU that are used to drive the wipers of the wiper system.

Block 906 calculates a total duty cycle of operation for the wiper blades, and Block 908 compares the total duty cycle to a duty cycle threshold. Block 910 provides an indication based at least in part on the comparison of the total duty cycle to the duty cycle threshold for the wiper blade. The method 900 ends at 912. It should be understood that the method 900 can continuously monitor the wiper blades in accordance with the method.

Figure 10:
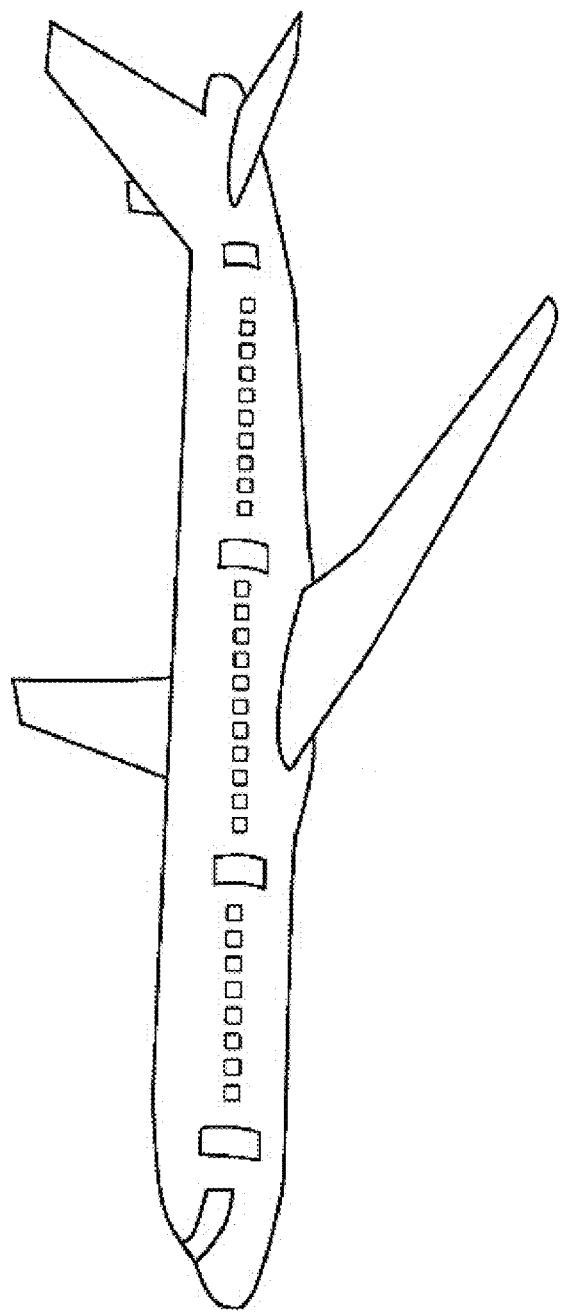
FIG. 10 depicts an aircraft that can implement any of the wiper systems described above.

Referring now to FIG. 10, an aircraft 1000 is shown that can implement the systems described herein. It should be understood the wiper system and wash system can be implemented on other types of vehicles not limited to rotorcrafts, trains, boats, and other vehicles.

The technical effects and benefits include automatic monitoring of the wiper blade usage of the wiper system in a variety of modes which can aid in the accurate planning of the maintenance of the wiper system.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for monitoring a wiper system, the method comprising:
   reading a radio frequency identification (RFID) tag embedded in a wiper blade using a reader;
   determining when the wiper blade was put into service based on data stored corresponding to the read RFID tag;
   determining blade usage based on time elapsed since the wiper blade was placed into service;
   determining a blade usage ratio for the wiper blade based on time elapsed and a blade replacement interval;
   providing an indication of a wiper blade status of the wiper blade based at least in part on the blade usage ratio;
   calculating a total duty cycle of the wiper blade based at least in part on a function of a duration of time the wiper blade is operated in each mode; and
   connecting the ECU to at least one of an LED indicator system or external device (PED) to display the wiper blade status of the wiper blade based on the total duty cycle.

2. The method of claim 1, further comprising responsive to an unsuccessful reading of the RFID tag, providing a fault indication.

3. The method of claim 1, further comprising responsive to determining the wiper blade has been replaced, resetting the blade usage, otherwise continuing to increment the blade usage for the wiper blade from a current blade usage.

4. The method of claim 3, wherein the wiper blade status is determined by comparing the blade usage ratio to a blade usage ratio threshold.

5. The method of claim 4, wherein the blade usage ratio is determined from the following equation:

$$\text{Blade Usage Ratio }(BUR) = \frac{\text{Current Blade Usage}}{\text{Blade Replacement Interval}}$$

wherein the current blade usage is at least one of a duration of time the wiper blade is operated or a number of sweeps the wiper blade is operated, and wherein the blade replacement interval is a configurable interval based on an expected life of the wiper blade.

6. The method of claim 4, wherein providing the indication comprises illuminating a corresponding LED based on comparing the blade usage ratio to a blade usage ratio threshold.

7. The method of claim 1, further comprising:
   monitoring, by an electronic control unit, an operation of the wiper blade of the wiper system;
   calculating a total duty cycle for operating the wiper blade;
   comparing the total duty cycle to a duty cycle threshold; and
   providing an indication of the wiper blade status of the wiper blade based at least in part on the comparison of the total duty cycle to the duty cycle threshold.

8. The method of claim 7, further comprises operating the wiper blade system in at least a low-speed mode, a medium-speed mode, and a high-speed mode.

9. The method of claim 8, further comprises calculating a duty cycle corresponding to each mode of operating the wiper blade system.

10. The method of claim 7, further comprising responsive to installing a new wiper blade, storing the RFID of the new wiper blade; and
    resetting the total duty cycle stored for new wiper blade.

11. A system comprising:
    one or more wiper blades;
    an electronic control unit (ECU) configured to monitor the one or more wiper blades and determine a wiper blade status of the one or more wiper blades and calculate a total duty cycle of the one or more wiper blades based at least in part on a function of a duration of time the one or more wiper blades are operated in each mode;
    a radio-frequency identification (RFID) tag embedded in the one or more wiper blades; and
    an RFID reader configured to read the RFID tag embedded in the one or more wiper blades,
    wherein the ECU is connected to at least one of an LED indicator system or external device to display the wiper blade status of the one or more wiper blades based on the total duty cycle.

12. The system of claim 11, further comprising a portable electronic device (PED) configured to communicate with the ECU.

13. The system of claim 11, wherein the ECU is configured to calculate a blade usage ratio for the one or more wiper blades that is based at least on one of a duration of time the one or more wiper blades are operated or a number of sweeps the one or more wiper blades are operated.

14. The system of claim 11, further comprising a motor control unit that is configured to drive the one or more wiper arms and is coupled to the ECU, wherein the ECU is configured to monitor a duty cycle for each mode of operation the wiper system.

15. The system of claim 11, further comprising an LED indicator system is configured to provide an indication of the wiper blade status of the one or more wiper blades.

16. The system of claim 11, wherein the ECU is configured to automatically detect a replaced wiper blade based on the RFID tag.

17. The system of claim 11, further comprising an interface to communicate with a ground maintenance server or cockpit for preventive maintenance to indicate wiper blade status of the one or more wiper blades.

18. The system of claim 11, further comprising a scanner configured to read the embedded RFID tag.

* * * * *